United States Patent
Miklós (10) Patent No.: US 6,621,796 B1
(45) Date of Patent: Sep. 16, 2003

(54) DISCARD MECHANISM FOR SELECTIVE REPEAT AUTOMATIC REPEAT REQUEST

(75) Inventor: György Miklós, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/273,259

(22) Filed: Mar. 22, 1999

(51) Int. Cl.$^7$ .................................................. H04L 1/20
(52) U.S. Cl. ........................ 370/236; 370/394; 370/410; 714/746
(58) Field of Search ........................... 370/235, 236, 370/410, 231, 252, 389, 390, 392, 394; 714/746, 751, 814, 815, 748, 749, 750, 18, 55; 713/600

(56) References Cited

U.S. PATENT DOCUMENTS

| | | | |
|---|---|---|---|
| 5,222,061 A | | 6/1993 | Doshi et al. .................. 370/13 |
| 5,610,595 A | | 3/1997 | Garrabrant et al. ..... 340/825.52 |
| 5,754,754 A | * | 5/1998 | Dudley et al. ................. 714/18 |
| 5,799,012 A | * | 8/1998 | Ayerst et al. ................ 370/336 |
| 5,875,292 A | * | 2/1999 | Taketsugu ..................... 714/18 |
| 6,219,558 B1 | * | 4/2001 | Konta ........................ 455/509 |
| 6,359,888 B1 | * | 3/2002 | Koch et al. .................. 370/394 |
| 6,424,625 B1 | * | 7/2002 | Larsson et al. .............. 370/236 |

\* cited by examiner

Primary Examiner—Dang Ton
Assistant Examiner—Tri H. Phan

(57) ABSTRACT

A more effective discard mechanism for Selective Repeat ARQ is achievable, where the discard mechanism exhibits a sender-initiated discard signaling scheme. The discard mechanism is also more effective where it takes into consideration the segmentation and reassembly of upper layer data packets, if such is being employed, and where it is able to notify the receiver when data units have been discarded at the sender, regardless whether explicit discard signaling from the sender to the receiver is feasible.

34 Claims, 6 Drawing Sheets

DISCARD MECHANISM FOR SELECTIVE REPEAT AUTOMATIC REPEAT REQUEST

FIELD OF INVENTION

The present invention involves the field of telecommunications. More particularly, the present invention involves the use of Automatic Repeat Request (ARQ) in wireline and wireless telecommunications systems and data networks.

BACKGROUND

Automatic Repeat Request (ARQ) is a commonly used technique in telecommunications systems and data networks. It is used to ensure the reliable delivery of protocol data units (PDUs) from a sending entity (herein referred to as a sender) to a receiving entity (herein referred to as a receiver). In general, ARQ employs an error detection code during data transmission. The error detection code allows the receiver to determine whether a given PDU was correctly received. ARQ also employs a feedback mechanism, which the receiver uses to notify the sender that a PDU was or was not correctly received. The sender may then retransmit the PDU based on the feedback provided by the-receiver.

Generally, there are three main ARQ types: Stop-and-Wait, Go-Back-N, and Selective Repeat. In accordance with the Stop-and-Wait ARQ, a sender does not send a PDU to the receiver until it receives positive acknowledgment from the receiver that the previous PDU has been received. In accordance with the Go-Back-N ARQ, the sender may transmit one or more PDUs before it receives positive acknowledgement (Ack) from the receiver regarding previous PDUs. If, however, the sender receives a negative acknowledgement (Nack) from the receiver indicating that a previous PDU was not received, the sender retransmits the missing or incorrectly received PDU, as well as all subsequent PDUs, whether or not they were received correctly. In accordance with the Selective Repeat ARQ, the receiver provides a combination of negative acknowledgments and positive acknowledgments. The sender then retransmits those PDUs which were not received, but the sender does not retransmit, as in Go-Back-N ARQ, all subsequent PDUs. Of course, there are any number of different variants associated with each of the three main ARQ types.

Normally, PDUs are delivered from the sender to the receiver without allowing for the loss of these PDUs. The reason for this is that conventional ARQ techniques retransmit a PDU until it is successfully received at the receiver and acknowledged at the sender. However, indefinite retransmission is unrealistic and undesirable. Accordingly, it is sometimes advantageous to terminate the retransmission process and discard the PDU.

The mechanism employed to discard PDUs should, of course, efficiently discard the PDUs in a timely manner. In doing so, the chance of transmitting obsolete data is minimized. For instance, there are many applications, such as real-time voice and video applications, where the data being transmitted is useful for only a very short period of time. Beyond that, the data is obsolete. Transmitting such data is not only useless, it wastes network resources as well as bandwidth.

The discard mechanism employed should also discard PDUs in an effective manner so as to avoid, or at least minimize, situations that could lead to deadlock. In addition, the discard mechanism should provide a discard signaling scheme that guards against such things as PDU identification ambiguity, de-allocation of input buffer space at the receiver before a corresponding PDU is actually discarded at the sender, or the like. Moreover, the discard mechanism should provide a way to notify the receiver when PDUs have been discarded at the sender, even if there is no provision in the protocol for explicit signaling.

Additionally, the discard mechanism should take into consideration the segmentation and reassembly of upper layer data packets, such as Internet Protocol data packets, wherein segmentation and reassembly is a common technique used in transporting upper layer data packets. For the purpose of simplicity, upper layer data packets are simply referred to herein below as "data packets". Where segmentation and reassembly of data packets is employed, several PDUs may be required to transport the data associated with a single data packet. Accordingly, the receiver must be able to determine, among other things, the correct sequence of the PDUs, and determine the data packet to which each PDU belongs. Typically, this is accomplished by assigning each PDU a sequence number, where sequence numbers may, for example, range from 0 to $2^{k-1}$ in accordance with a modulo 2 format, where k represents the number of bits which comprise a sequence number, and by adding a start bit and stop bit to the first and last PDU associated with each data packet respectively. The discard mechanism must be able to recognize when a PDU associated with a data packet has been discarded and, at the sender, discard the entire data packet with which the discarded PDU is associated. Also, if the receiver has already received any PDU associated with that data packet, the discard mechanism must be able to notify the receiver to discard these PDUs as well.

Of course, there are a number of known discard mechanisms for ARQ. One such discard mechanism involves a receiver-initiated discarding signaling scheme. However, this technique is not overly attractive, particularly because the sender, and not the receiver, is a better position to determine how and when to cease the retransmission of and the discarding of PDUs.

In accordance with another discard mechanism described in co-pending U.S. patent application Ser. No. 09/179,952, "ARQ Discard Capability," a single bit called the receive packet enforcement bit (RPEB) in the header portion of each PDU is used to notify the receiver that it should not expect to receive PDUs having a lower sequence number, and that the receiver should accept that PDU out of sequence. Although that application does show that the RPEB could be applied to Selectively Repeat ARQ, the application is primarily directed at discard signaling for the Go-Back-N type ARQ.

In co-pending U.S. patent application Ser. No. 09/245,866, "Prime ARQ Control Flow Including Cell Discard," yet another discard mechanism is described. In this application, however, the discard mechanism is designed to be used in conjunction with prime ARQ, a variable of Go-Back-N and Selective Repeat ARQ.

Accordingly, it would be desirable to provide a discard mechanism that exhibits each of the various capabilities described above. More particularly, it would be desirable to provide a sender-initiated discard mechanism that is specifically designed to operate efficiently and effectively with Selective Repeat ARQ.

SUMMARY OF THE INVENTION

The present invention involves the use of ARQ techniques to help ensure the reliable delivery of data packets, herein referred to as protocol data units (PDUs) from a sender to a receiver. More specifically, the present invention involves a Selective Repeat ARQ technique which employs a sender-initiated PDU discard mechanism that is specifically designed to be used in conjunction with Selective Repeat ARQ.

Accordingly, it is an objective of the present invention to provide a discard mechanism for selectively repeat ARQ that employs sender-initiated signaling rather than receiver-initiated signaling.

It is another objective of the present invention to provide a sender-initiated, discarding mechanism for Selective Repeat ARQ that takes into consideration the segmentation and reassembly of data packets.

It is still another objective of the present invention to provide a sender-initiated discard mechanism for selective repeat ARQ, even when there is no explicit discard signaling capability.

In accordance with a first aspect of the present invention, the above-identified and other objects are achieved by a method for discarding data units for Selective Repeat ARQ. The method involves transmitting a first data unit from a sender to a receiver and initiating a first timer in connection with the transmission of the first data unit. The method also involves transmitting a second data unit from the sender to the receiver, and initiating a second timer in connection with the second data unit being received. At the sender, the first data unit is discarded if a time period corresponding to the first timer expires before the sender receives an acknowledgment from the receiver that the first data unit was received. Thereafter, a purge operation is performed at the receiver, as a function of the second data unit, if a time period corresponding to the second timer expires before the first data unit is received.

In accordance with a second aspect of the present invention, the above-identified and other objects are achieved by a method for discarding data units for Selective Repeat ARQ. The method involves transmitting, from a sender to a receiver, a plurality of data units, where each of the plurality of data units is associated with a common data packet, and where each of the data units is assigned a sequence number representing the order in which the corresponding data unit is transmitted. Furthermore, a first timer is initiated in connection with the transmission of the first of the plurality of data units, and a second timer is initiated if one of the plurality of data units is received when the receiver is still expecting to receive a data unit having a sequence number that indicates that the data unit was transmitted before the one of the plurality of data units. Then, at the sender, each of the plurality of data units associated with the common data packet is discarded if any one of the plurality of data units has not been acknowledged as being received before a time period associated with the first timer expires. At the receiver, a purge operation is then performed as a function of the one of the plurality of data units, if a time period associated with the second timer expires and the receiver is expecting to receive a data unit having a sequence number which indicates that it was transmitted before the one of the plurality data units.

In accordance with a third aspect of the present invention, the above-identified and other objects are achieved by a method for discarding data units for Selective Repeat ARQ. The method involves transmitting a plurality of data units from a sender to a receiver, where a timer is maintained at the sender and a timer is maintained at the receiver, and where each of the plurality of data units is assigned a sequence number representing the order in which the corresponding data unit is transmitted. In addition, a variable HSS is maintained at the sender, where HSS represents the highest sequence number of any data unit that has been transmitted at a given point during a present cycle of the timer being maintained at the sender. At the receiver, two variables, HSR1 and HSR2, are maintained, where HSR1 represents the highest sequence number of any data unit received at a given point during a present cycle of the timer maintained at the receiver, and where HSR2 represents the highest sequence number of any data unit received at a same point during a previous cycle of the timer maintained at the receiver. Then, at the given point during each cycle of the timer maintained at the sender, any data unit at the sender that has a sequence number less than the variable HSS is discarded. Thereafter, the variable HSS is updated. At the given point during each cycle of the timer maintained at the receiver, any data unit having a sequence number less than the variable HSR2 is discarded. Thereafter, the variables HSR1 and HSR2 are updated.

In accordance with a fourth aspect of the present invention, the above-identified and other objects are achieved by a method for discarding data units for Selective Repeat ARQ. The method involves defining a transmission window, where the transmission window represents a sequence of K data units which are eligible for transmission from a sender to a receiver, where each data unit is assigned a sequence number which represents the order of transmission associated with the corresponding data unit. At the sender, a data unit that is currently within the transmission window is discarded, where the data unit has a sequence number that indicates that the data unit was transmitted prior to all other data units currently in the transmission window. The transmission window is then advanced forward accordingly. In addition, a receiving window is defined at the receiver, where the receiving window represents a sequence of data units which the receiver has received or is expecting to receive. If the receiver receives a data unit having a sequence number S, wherein the sequence number S is above the receiving window, a purge operation at the receiver is performed as a function of the sequence number S-K+1.

In accordance with a fifth aspect of the present invention, the above-identified and other objects are achieved by a method for discarding data units for Selective Repeat ARQ. The method involves transmitting a plurality of data units from a sender to a receiver, where the plurality of data units are associated with data packets, and where each data packet may be associated with one or more data units. At the sender, the first data unit associated with a data packet is stored until the receiver completely acknowledges the data packet. Then, one or more data units are discarded, at the sender, where the discarded data units have a sequence number indicating that they were transmitted before the first data unit. A discard bit in the header portion of the first data unit is then set, and the first data unit is transmitted to the receiver, so as to notify the receiver that the one or more data units have been discarded at the sender. Finally, a purge operation is performed at the receiver as a function of a sequence number associated with the first data unit.

In accordance with a sixth aspect of the present invention, the above identified and other objects are achieved by a method of discarding data units for Selective Repeat ARQ. The method involves transmitting a plurality of data units from a sender to a receiver, where the data units are associated with data packets such that each data packet may comprise one or more data units, and each of the data units are assigned a sequence number indicating the order of transmission for the corresponding data unit. The method also involves discarding a data unit at the sender and generating one or more discard-signaling data units by setting a discard bit in a header portion of each data unit at the receiver associated with a next available data packet at the sender, where the next available data packet at the sender includes one or more data units that have not been discarded or acknowledged by the receiver, and where each of the one or more data units have a sequence number indicating that the one or more data units associated with the next available data packet were transmitted after the discarded data unit. The one or more discard-signaling data units are then transmitted, and upon receiving any of the one or more discard-signaling data units, a received data unit associated with a non-completely received data packet is discarded if the received data unit has a sequence number indicating that it was transmitted before any of the one or more discard-signaling data units.

In accordance with a seventh aspect of the present invention, the above identified and other objects are achieved by a method of discarding data units for Selective Repeat ARQ. The method involves transmitting a plurality of data units from a sender to a receiver, where each of the data units are assigned a sequence number indicating the order of transmission for each data unit. A data unit is then discarded at the sender and a discard-signaling data unit is generated as a function of a first undischarged data unit following the discarded data unit, where a discard-signaling data unit has a discard bit in a header portion of the data unit set and a data valid bit in the header portion of the data unit reset. Thereafter, the discard-signaling data unit is transmitted to the receiver and a purge operation is performed at the receiver as a function of the sequence number associated with the discard-signaling data unit.

BRIEF DESCRIPTION OF THE FIGURES

The objects and advantages of the present invention will be understood by reading the following detailed description in conjunction with the drawings in which.

DETAILED DESCRIPTION OF THE INVENTION

The present invention involves Selective Repeat ARQ, and more particularly, discard mechanisms to be used there-with. In Selective Repeat ARQ, a receiving entity (herein referred to as the receiver) provides cumulative acknowledgement signals, selective negative acknowledgment signals, and selective positive acknowledgment signals for a sending entity (herein referred to as the sender). The selective negative acknowledgment signal informs the sender that a particular PDU has not been received at the receiver. The selective positive acknowledgment signal informs the sender that a particular PDU has been received. The cumulative acknowledgment signal informs the sender that all PDUs up to and including the one with the sequence number identified in the cumulative acknowledge signal, have been received or discarded by the receiver. The sender can then determine, based on the cumulative acknowledgment signal and the selective positive acknowledgment signal, which PDUs to release from its buffer. In contrast, the sender can determine which PDUs to retransmit based on the selective negative acknowledgment signal.

Generally, Selective Repeat ARQ techniques employ a "transmission window" at the sender and a "receiving window" at the receiver, wherein a window represents an interval of PDU sequence numbers which are available for either transmission or reception. However, in order to avoid ambiguities over PDU identification which could arise when transmitting two PDUs having the same sequence number in the PDU header, it will be understood that the maximum window size is $2^{k-1}$, where each sequence number comprises k number of bits.

In accordance with a first exemplary embodiment of the present invention, synchronized triggers in the form of timers are employed at the sender and at the receiver for the purpose of determining which PDUs to discard, wherein the triggering at the sender is guaranteed to occur before the triggering at the receiver for a given PDU. Because the discard mechanism in this first exemplary embodiment relies on synchronized timing triggers, explicit signaling to notify the receiver when the sender has discarded one or more PDUs is not required, thereby conserving network resources and bandwidth.

As stated, the synchronized triggers take the form of timers, in accordance with this first exemplary embodiment, wherein a timer at the sender begins measuring a time period $T_S$ when a PDU is first transmitted from the sender to the receiver. In general, the sender discards the PDU if, after the expiration of the time period $T_S$, the sender failed to receive an acknowledgment from the receiver that the PDU has been correctly delivered to and received by the receiver. When, at the receiver, a PDU with sequence number S is received and there is at least one missing PDU with a sequence number lower than S, a timer begins measuring a time period $T_R$ that is at least as long as the time period $T_S$. If the time period $T_R$ expires and there are still missing PDUs that have a sequence number lower than the sequence number S, the receiver performs what is herein referred to as a purge(S) operation.

During a purge(S) operation, PDUs which have been correctly received are in general, delivered to an upper network layer. However, all missing PDUs having a sequence number lower than S are released, where it will be understood that releasing a PDU at the receiver refers to de-allocating the input buffer space associated with that PDU, thereby making the space available for other PDUs. In addition, all of the missing PDUs are acknowledged by the receiver, since the receiver no longer expects to receive them. If segmentation and reassembly of data packets is employed, the purge(S) operation involves discarding PDUs that have been received, where the PDUs have a sequence number less than S and are associated with non-completely received data packets.

Figure 1A:
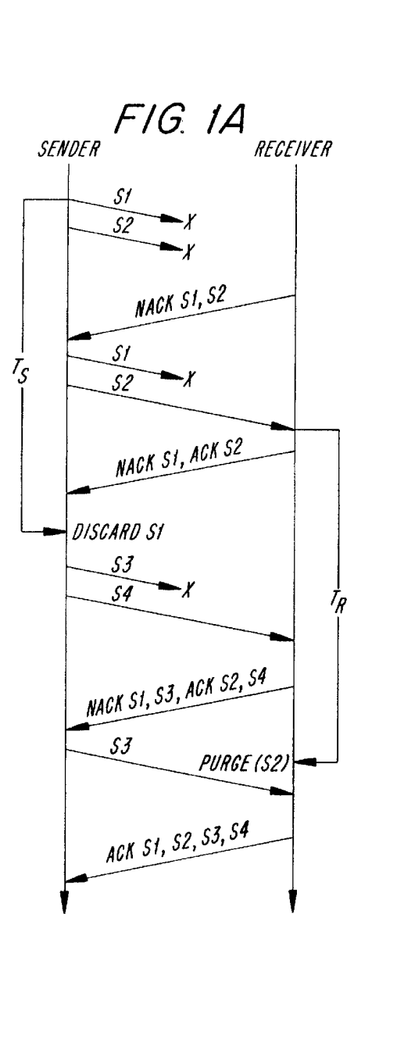
FIGS. 1A–B illustrate a first exemplary embodiment of the present invention, and an alternative thereto, respectively, wherein synchronized timers are used to trigger PDU discarding.

FIG. 1A illustrates a timeliness of events to further illustrate the discard mechanism of this first exemplary embodiment of the present invention. As shown, the leftmost vertical line represents a timeliness of events occurring at the sender, while the right-most vertical line represents a timeline of events occurring at the receiver. Moreover, the arrows originating from the receiver represent ARQ messages being transmitted back to the sender, while the arrows originating from the sender represent PDUs being transmitted, or retransmitted, to the receiver.

As shown in FIG. 1A, the sender initially transmits a first PDU S1. Simultaneous to the transmission of S1, the sender starts a timer to measure a time period $T_S$. The sender then transmits a second PDU S2. While the sender begins measuring a new time period that corresponds to the transmission of S2, the indication of such is omitted from FIG. 1A for the purpose of simplicity.

As indicated by the "x" designation, neither S1 nor S2 are successfully received into the input buffer of the receiver. Therefore, the ARQ message transmitted back to the sender notifies the sender that S1 and S2 were not successfully received, as illustrated by ARQ(Nack S1, S2). Accordingly, the sender retransmits S1 and S2, as shown. In retransmitting S1 and S2, only S2 is successfully received. Because there is a missing PDU (i.e., S1) with a lower sequence number than S2 when S2 is received, the receiver begins measuring a time period $T_R$. The receiver then transmits another ARQ message back to the sender, notifying the sender that S1 was not successfully received and that S2 was successfully received, as illustrated by ARQ(Nack S1, Ack S2). However, before the sender can retransmit S1, the time period $T_S$ expires.

The expiration of time period $T_S$ is the trigger that, in turn, causes the sender to now discard S1 rather than retransmit S1, as illustrated in FIG. 1A. The sender then transmits S3 and S4. Upon receiving S4, the receiver transmits another ARQ message, ARQ(Nack S1, S3; Ack S2, S4), which notifies the sender that the receiver has still not yet received S1 (which has already been discarded by the sender) and that the receiver has not yet received S3. At the same time, the ARQ message also notifies the sender that the receiver did successfully receive S2 and S4. The sender, as indicated, responds by retransmitting S3.

Before S3 is successfully received, however, the time period $T_R$ expires, causing the receiver to execute a purge(2) operation. Consequently, all missing PDUs having a sequence number lower than S2 (i.e., S1) are released at the receiver. Moreover, the receiver transmits yet another ARQ message back to the sender, notifying the sender that the receiver has acknowledged S1, S2, S3 and S4.

Figure 1B:
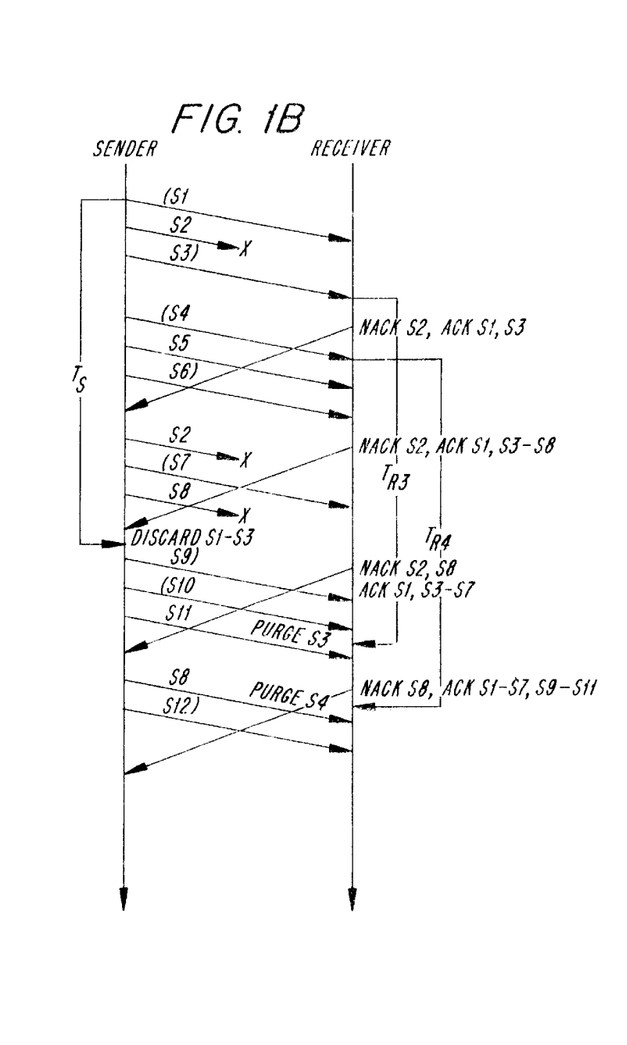

FIG. 1B illustrates a timeliness of events to illustrate a discard mechanism similar to the discard mechanism illustrated in FIG. 1A, but for the discard mechanism in FIG. 1B takes into consideration the segmentation and reassembly of data packets. In the example illustrated in FIG. 1B, each data packet consists of three PDUs, for example, a first data packet consists of PDU S1, PDU S2 and PDU S3, herein referred to as S1, S2 and S3, wherein the left and right parentheses indicate the first and last PDU of a given data packet respectively. It will be understood, however, that the data packets may consist of more or less than three PDUs. Furthermore, it will be understood that only one timer needs to be maintained at the sender for each data packet.

As illustrated in FIG. 1B, the sender initially transmits the three PDUs associated with the first data packet, S1, S2 and S3. In accordance with this alternative discard mechanism, the sender initiates a timer, to measure a time period $T_S$, simultaneous to the transmission of the first PDU in each data packet (i.e., simultaneous to the transmission of S1). In this example, the receiver correctly receives S1 and S3 only, but not S2, as indicated by the "x" designation. As in the first exemplary embodiment described above, the receiver initiates a timer to measure a time period $T_{R3}$ since it received a PDU (i.e., S3) when there was at least one missing PDU having a lower sequence number (i.e., S2). The receiver now sends an ARQ message back to the sender, notifying the sender that it has successfully received S1 and S3, but not S2. At approximately the same time, the sender transmits the next data packet consisting of S4, S5 and S6, as shown.

Upon receiving S4, the receiver begins measuring another time period $T_{R4}$ because S2, having a lower sequence number than S4, is still missing. Though it is not shown, the receiver would likewise initiate timers upon receiving S5 and S6. At approximately the same time the receiver successfully receives S4, S5 and S6, the sender actually receives the ARQ message containing the notification that the receiver never received S2. Thus, the sender retransmits S2, along with the first two PDUs, S7 and S8, associated with the next data packet.

At approximately the same time that the sender retransmits S2, the receiver sends another ARQ message back to the sender which notifies the sender that the receiver has successfully received S1 and S3–S6, and that it has yet to receive S2. At about the same time that the sender actually receives this ARQ message, the time period $T_S$ expires. Since S2, at this point, has not been acknowledged, the sender discards, not only S2, but all the other PDUs associated with the first data packet (i.e., S1 and S3). Because the sender discards S1, S2 and S3, the transmission window advances forward. Accordingly, the sender transmits new PDUs, such as S9, S10 and S11, where S10 is the first PDU of yet another data packet.

At about the time the sender transmits S9, the receiver, which does not know that the sender has discarded S1, S2 and S3, transmits another ARQ message back to the sender which notifies the sender that the receiver never received S2 or S8. In addition, the ARQ message notifies the sender that S1 and S3–S7 were successfully received. Soon thereafter, the time period $T_{R3}$ expires as indicated. Accordingly, a purge(3) operation is performed at the receiver. In accordance with the purge(3) operation, the buffer space at the receiver allocated for any missing PDUs having a sequence number lower than S3 is released. Any PDUs associated with a previous, incomplete data packet are discarded, if received or released. In the present case, the purge(3) operation results in the discarding of S1 and the release of the buffer space that was allocated for S2. Soon thereafter, the time period $T_{R4}$ expires, as shown, such that a purge(4) operation is performed at the receiver. This results in the discarding of S3, since S3 was received and is associated with a previous and incomplete data packet. Once again, the receiver window advances forward accordingly.

It should be noted that in a preferred embodiment of the present invention, the transmission window and the receiving window are advanced on a PDU-by-PDU basis. Thus, for example, when a PDU at the very bottom of the transmission window is discarded, the transmission window advances forward by one PDU. However, as one skilled in the art will appreciate, the transmission window and the receiving window could be advanced on a data packet-by-data packet basis. In accordance with this alternative approach, a PDU at the bottom of the transmission window may be discarded, but the transmission window does not advance until all of the PDUs associated with the corresponding data packet are discarded. Of course, the window would advance forward by the numbers of PDUs in the corresponding data packet.

In accordance with another alternative discard mechanism, only a single timer is employed at the sender and a single timer at the receiver. However, in order to avoid synchronization problems, the time constant associated with the single timer at the receiver must be no less than the time constant associated with the single timer at the sender. Otherwise, the receiver might discard a given PDU i.e., de-allocate the buffer space that was set aside for the PDU) before the sender has actually discarded the PDU. To simplify the explanation of this alternative discard mechanism, the single timer at the sender and the single timer at the receiver are given the same time constant.

In addition to maintaining a single timer at the sender and a single timer at the receiver, the sender, according to this alternative, maintains a variable HSS, where the value of HSS represents the highest sequence number assigned to a PDU transmitted thus far, and where the value of HSS is updated once during each time period associated with the single timer at the sender, preferably at the beginning of each time period. As explained above, the sequence number may range from 0 through $2^{k-1}$, in accordance with modulo 2 format, wherein k represents the number of bits comprising a sequence number. Therefore, it would be understood that the phrase "highest sequence number" is not necessarily the largest sequence number value, but is to be interpreted in terms of the modulo 2 format. The receiver, on the other hand, maintains two such variables HSR1 and HSR2, where the value of HSR1 represents the highest sequence number of any PDU received by the receiver at the beginning of the present cycle of the timer associated with the receiver, while the value of HSR2 represents the highest sequence number of any PDU received by the receiver at the beginning of the previous cycle of the timer associated with the receiver.

In general, this second alternative discard mechanism works as follows. When the timer associated with the sender begins its present cycle, the sender discards from its buffer all PDUs having a sequence number less than the present value of the variable HSS. Thereafter, the sender updates the value of HSS as described above. Thus, all PDUs which have been sent, but not acknowledged after at least one full cycle are discarded. In contrast, when the timer associated with the receiver begins its present cycle, the receiver discards all PDUs having a sequence number less than the present value of the variable HSR2. Thereafter, the receiver updates the value of HSR2 with the current value of HSR1, and it updates the value of HSR1 with the current highest sequence number of any PDU received. Accordingly, the receiver discards only PDUs with sequence numbers less than the highest sequence number of any PDU transmitted to the receiver at the beginning of the previous cycle, thereby preventing the receiver from accidentally discarding any PDUs that the sender is still attempting to transmit or retransmit.

Figure 2:
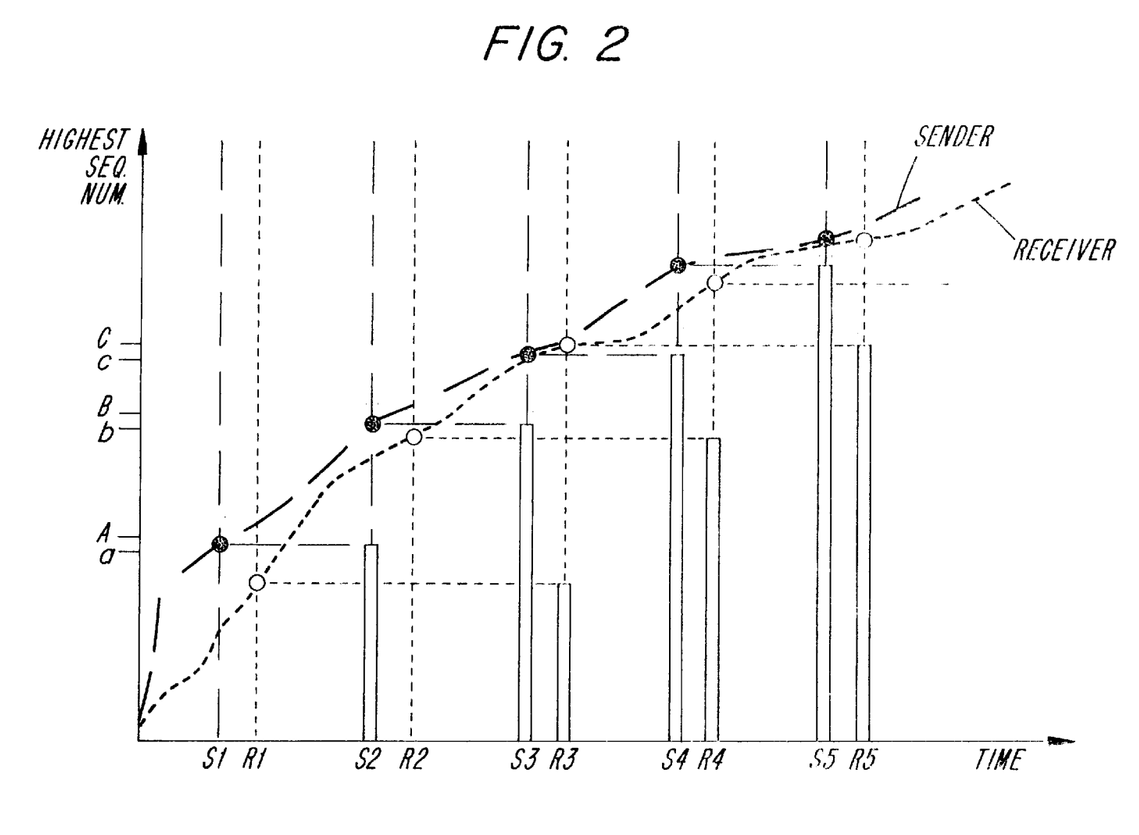
FIG. 2 illustrates an alternative embodiment of the present invention, wherein a single timer at the sender and a single timer at the receiver is used to trigger PDU discarding.

FIG. 2 illustrates in greater detail this alternative discard mechanism, wherein the vertical axis represents the sequence numbers of the PDUs being transmitted from the sender to the receiver, and wherein the horizontal axis represents the passage of time. The period of time between each "dashed" vertical line represents a full cycle associated with the single timer at the sender, while the period of time between each "dotted" vertical line represents a full cycle associated with the single timer at the receiver. Furthermore, the "dashed" graph represents the highest sequence number of any PDU at the sender, while the "dotted" graph represents the highest sequence number of any PDU at the receiver.

As illustrated in FIG. 2, the sender, at the beginning of its first cycle, which occurs at time S1, sets the variable HSS equal to the value of the highest sequence number at the sender. In the example illustrated in FIG. 2, the highest sequence number at the sender at time S1 is "A". The receiver, at the beginning of its first cycle, which occurs at time R1, sets the variable HSR1 equal to the value of the highest sequence number at the receiver. In the example of FIG. 2, the highest sequence number at the receiver at time R1 is "a". Then, at the beginning of the second send cycle, which occurs at time S2, the sender discards all PDUs having a sequence number less than the value of "A". These sequence numbers are represented graphically by the "shaded" line overlaying the lower portion of the "dashed" vertical line at time S2. Thereafter, the sender updates the variable HSS with the current highest sequence number at the sender. In the example of FIG. 2, this value is "B". At the beginning of the second receive cycle, which occurs at time R2, the receiver sets the variable HSR2 equal to "a", which is the current value of HSR1. The receiver then updates the value of HSR1 to equal the value of the highest sequence number at the receiver at time R1, which is shown in FIG. 2 as being "b".

At the beginning of the third send cycle, which occurs at time S3, the sender discards all PDUs having a sequence number less than the current value of HSS. In the example of FIG. 2, the current value of HSS at this point is "B". The sequence numbers less than "B" are represented by the "shaded" line overlaying the lower portion of the "dashed" vertical line at time S3. Thereafter, the sender updates the value of the variable HSS with the value of the highest sequence number at the sender at time S3. At the beginning of the third receive cycle, which occurs at time R3, the receiver discards all PDUs having a sequence number less than "a", the current value of HSR2. The sequence numbers less than "a" are represented by the "shaded" vertical line that overlays the lower portion of the "dotted" vertical line at time R3. Thereafter, the receiver sets the variable HSR2 equal to "b", the current value of HSR1. Then the receiver sets the variable HSR1 equal to "c", the highest sequence number at the receiver at time R3.

It will be understood from FIG. 2 that the procedure described above repeats itself continuously. Further, it will be understood that the procedure described above could be applied even if segmentation and reassembly of data packets is employed. In which case, the sender would discard entire data packets that contain PDUs with sequence number that are less than the value of HSS, while the receiver would discard entire data packets that contain PDUs with sequence numbers that are less than the value of HSR2.

In accordance with a second exemplary embodiment of the present invention, a "window-based" approach is employed to facilitate discard signaling. Further in accordance with this second exemplary embodiment, a transmission window is defined at the sender, wherein the size of the transmission window is K sequence numbers in length, and wherein the first sequence number in the transmission window is associated with the PDU having the lowest sequence number of any PDUs at the sender that are unacknowledged (i.e., the sender has not yet received acknowledgment that the PDU has been successfully received) and not discarded. Still further in accordance with this second exemplary embodiment, only PDUs having a sequence number falling within the transmission window are eligible for transmission. In addition, a receiving window is defined at the receiver, wherein the size of the receiving window is also K sequence numbers in length.

The value of K must be less than the maximum window size of $2^{k-1}$. Moreover, the value of K may be predefined or it may be negotiated at startup. It is also possible for the value of K to change dynamically during transmission. As one skilled in the art will readily appreciate, the size of the buffer at the sender and the size of the input buffer at the receiver should be able to at least accommodate K PDUs.

The technique associated with the second exemplary embodiment works as follows. The sender transmits only PDUs that have a sequence number falling within the transmission window, as stated. However, as the sender discards PDUs, the transmission window is shifted forward so that PDUs having higher sequence numbers fall into the window and become eligible for transmission. Shifting the transmission window is allowed only to the extent that the top of the window does not exceed the sequence number corresponding to the cumulative acknowledgement point plus the maximum window size (CA+$2^{k-1}$), so as to avoid sequence number ambiguities. When a receiver successfully receives a PDU whose sequence number is above the receiving window, for example, a PDU having a sequence number S, the receiver performs a purge(S-K+1) operation. In accordance with the purge(S-K+1) operation, the receiver releases the input buffer space allocated to all missing PDUs that have a sequence number less than or equal to sequence number S-K. If segmentation and reassembly of data packets is employed, the purge(S-K+1) operation might also involve discarding all PDUs having a sequence number less than or equal to S-K that are associated with incomplete data packets, even though the PDUs themselves have been correctly received. The receiver can release or discard these PDUs because PDUs having a sequence number less than or equal to the sequence number S-K cannot possibly be in the transmission window any longer, so that if they have not yet been received, than the receiver cannot expect to receive them.

FIGS. 3A–3E illustrate the technique associated with the second exemplary embodiment. In FIGS. 3A–3E, the arc corresponding to the wedge-shaped portion of the circle represents the transmission window at the sender, while the arc outside the circle represents the receiving window at the receiver. As shown, the transmission window spans a portion of the circle from a point marked BM to a point marked TP, where BM represents the lowest sequence number at the bottom of the transmission window, and TP represents the highest sequence number at the top of the transmission window. Also shown is a point CA and a point CP. The point CA represents the cumulative acknowledgment point, wherein all PDUs having a sequence number less than or equal to the sequence number corresponding to CA have been acknowledged as being successfully received or discarded by the receiver. The CP point represents the current pointer, or the sequence number corresponding to the next new PDU to be transmitted from the sender to the receiver. In addition, FIGS. 3A–3E show a number of unmarked points along the arc corresponding to the transmission window between BM and CP. These unmarked points represent PDUs that have been transmitted, but not yet acknowledged as being successfully received.

Figure 3A:
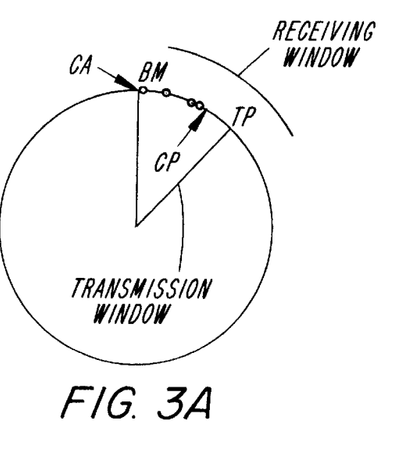
FIGS. 3A–3E illustrate a second exemplary embodiment of the present invention, wherein a "window-based" discarding mechanism is employed.
Figure 3B:
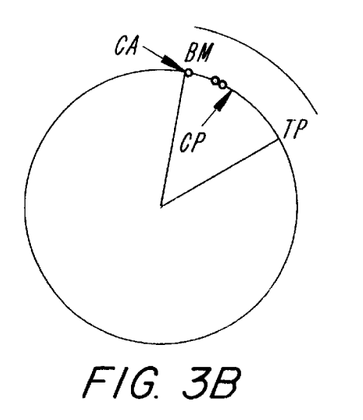
Figure 3C:
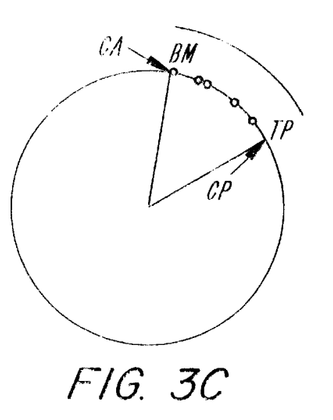

More specifically, FIG. 3A illustrates an initial situation, where the receiving window is ahead of, or forward with respect to, the transmission window. The reason the receiving window is ahead of the transmission window is that often, ARQ messages acknowledging one or more PDUs have not yet been received at the sender. Eventually, these ARQ messages are received and processed at the sender, thereby advancing the CA point and, consequently, the transmission window, as illustrated in FIG. 3B. In fact, the sender might continue to send PDUs up to and including the PDU having the highest possible sequence number in the transmission window. This situation is illustrated in FIG. 3C, where the point CP actually coincides with the point TP. The sender, at this point, is stalled. That is, it cannot transmit any new PDUs until the transmission window advances forward. Of course, the sender can continue to retransmit PDUs which have not been acknowledged and whose sequence numbers fall within the transmission window.

Figure 3D:
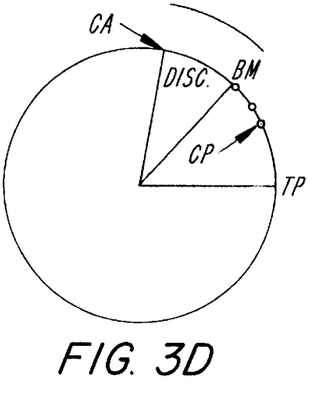
Figure 3E:
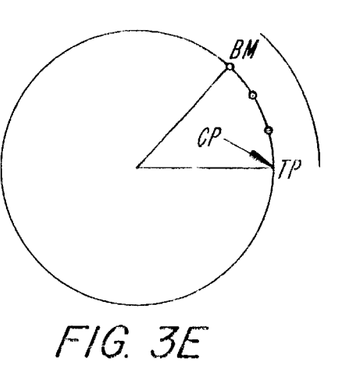

To avoid stalling for any significant length of time, the sender may decide to discard one or more PDUs at the bottom end of the transmission window, as illustrated in FIG. 3D. The decision to do this may, for example, be based on the fact that the sender has retransmitted the one or more PDUs a certain number of times, or the decision may be based on the expiration of a time period associated with the one or more PDUs. FIG. 3D also shows that by discarding the one or more PDUs at the bottom end of the transmission window, the transmission window can advance forward. In doing so, new PDUs fall into the transmission window so the sender is no longer stalled.

At this point, the receiving window is lagging behind the transmission window. However, receiving a PDU that is above the receiving window triggers the receiver to perform a purge operation. For example, if the PDU received has a sequence number S that corresponds to the value of TP in FIG. 3E, the receiver performs a purge(S-K+1) operation, which corresponds to a purge(BM) operation, wherein all PDUs having a sequence number less than the sequence number corresponding to BM at the bottom of the transmission window are discarded, thereby causing the transmission window and the receiving window to become aligned. This causes the receiver to release or discard all PDUs having a sequence number of S-K or less. If the PDUs are associated with a complete data packet, the PDUs are instead passed to an upper network layer for processing and/or transmission to a next-hop receiver. As stated above, it will be readily apparent that PDUs having a sequence number of S-K or less must be, by definition, below the transmission window and, therefore, no longer eligible for transmission. Accordingly, if these PDUs have not yet been correctly received, there is no chance that they will herein after be successfully retransmitted and received. After performing this purge operation, the receiving window may advance forward as shown.

In the first and second exemplary embodiments, as well as the various alternative embodiments described above, explicit signaling is not employed. That is, no additional bandwidth is expended to inform the receiver that certain PDUs have been discarded by the sender. The primary advantage realized by these exemplary embodiments is that bandwidth is more efficiently utilized. This may be particularly important where bandwidth is limited and/or expensive, which is quite often the case. However, if bandwidth is not limited or if speed, for example, is more important than the efficient use of bandwidth, alternative discard mechanisms may be employed, where explicit signaling is used to notify the receiver when one or more PDUs have been discarded by the sender.

The various exemplary embodiments described herein below, unlike those described above, rely on explicit signaling to notify the receiver when one or more PDUs have been discarded by the sender. In these exemplary embodiments, the header of each PDU includes what is herein referred to as a discard bit and possibly a data valid bit. When the discard bit is set in the header portion of a given PDU, it explicitly signals the receiver that all PDUs having a sequence number less than the sequence number of the given PDU have been discarded at the sender. The receiver should, consequently, no longer expect to receive these PDUs. The receiver can then perform a purge operation so that the receiving window can advance forward. If a data valid bit is being employed, in addition to the discard bit, and the data valid bit is set in the header portion of the given PDU, it explicitly signals the receiver that the payload portion of the PDU contains user data. If, in contrast, the data valid bit is reset, it explicitly signals the receiver that the payload portion of the PDU contains no user data, and that the receiver should only process the header portion of the PDU, and then discard the PDU. As will become evident, the exemplary embodiments described below distinguish over each other based on whether they employ a discard bit only, or whether they employ both a discard bit and a data valid bit. All of the exemplary embodiments described below, however, distinguish from those described above, in that those described above employ neither a discard bit or a data valid bit, as mentioned.

In accordance with a third exemplary embodiment of the present invention, a one bit extension to the header portion of each PDU is employed to facilitate discard signaling, where the one bit extension is a discard bit as described above. Further in accordance with this third exemplary embodiment, the sender keeps, in its buffer, the first PDU of any non-completely acknowledged data packet until the data packet is completely acknowledged (i.e., completely received or discarded). Thus, if the sender transmits all PDUs associated with a given data packet to the receiver, and in response, the sender gets a selective positive acknowledgment from the receiver indicating that the first PDU has been correctly received, the sender will keep that first PDU in its buffer until the entire data packet has been acknowledged (i.e., until all of the remaining PDUs have been acknowledged by the receiver through a selective or cumulative positive acknowledgment). A further requirement with this third exemplary embodiment, is that the sender, after performing a discard operation, continues to store in its buffer at least one valid PDU. It should be noted here that certain types of memory management systems require that PDUs associated with a given data packet be kept together, so that memory must be allocated and de-allocated for all PDUs associated with the given data packet at the same time. It should be further noted that this third exemplary embodiment is conducive for use with such memory management systems.

The discard mechanism associated with this third exemplary embodiment works as follows. When the sender discards PDUs up to and including those PDUs associated with a given data packet, an explicit discard signal is generated. That discard signal takes the form of a PDU, referred to herein as a discard-signal PDU, wherein the discard bit in the header portion of the discard-signal PDU is set. It follows that if the first undischarged PDU is available at the sender, and its sequence number falls within the transmission window, then the discard-signal PDU is the first undischarged PDU. If, however, the first undischarged PDU is not yet available at the sender, or the first undischarged PDU cannot be transmitted because it has a sequence number that falls above the transmission window, then the discard-signal PDU is the last-stored PDU. When the first undischarged PDU is transmitted at a later time, it will be transmitted with its discard bit set.

Further in accordance with this third exemplary embodiment, the sender regenerates a discard-signal PDU if it receives an ARQ message from the receiver that fails to acknowledge PDUs that have already been discarded by the sender, and if a minimum period of time $T^{min}$ has elapsed since the sender last transmitted a discard-signal PDU. It should be noted, however, that the regenerated discard-signal PDU may be different from the previous discard-signal PDU, since the previous discard-signal PDU may have been associated with a data packet that has been completely acknowledged. Regeneration of the discard-signal PDU is necessary to ensure that the receiver is notified that preceding PDUs have been discarded at the sender, even in the event that the preceding discard-signal is never successfully received at the receiver. It will be understood that the value of $T^{min}$ should be a constant, and that the value of $T^{min}$ should be at least as great as the time required to transmit a signal between the sender and the receiver and back.

Again, the third exemplary embodiment requires that the first undischarged PDU be the first PDU associated with a data packet, and that it is stored in the buffer of the sender until all of the PDUs associated with that data packet are acknowledged. If this was not required, the receiver might receive a PDU with the discard bit set, wherein the PDU is not the first PDU of a data packet. And upon receiving the PDU, the receiver would perform a purge operation causing the first PDU of the data packet to be discarded. The advantage of the third exemplary embodiment is that a relatively simple one bit extension to the header portion of each PDU can provide a robust discard signaling mechanism.

Figure 4:
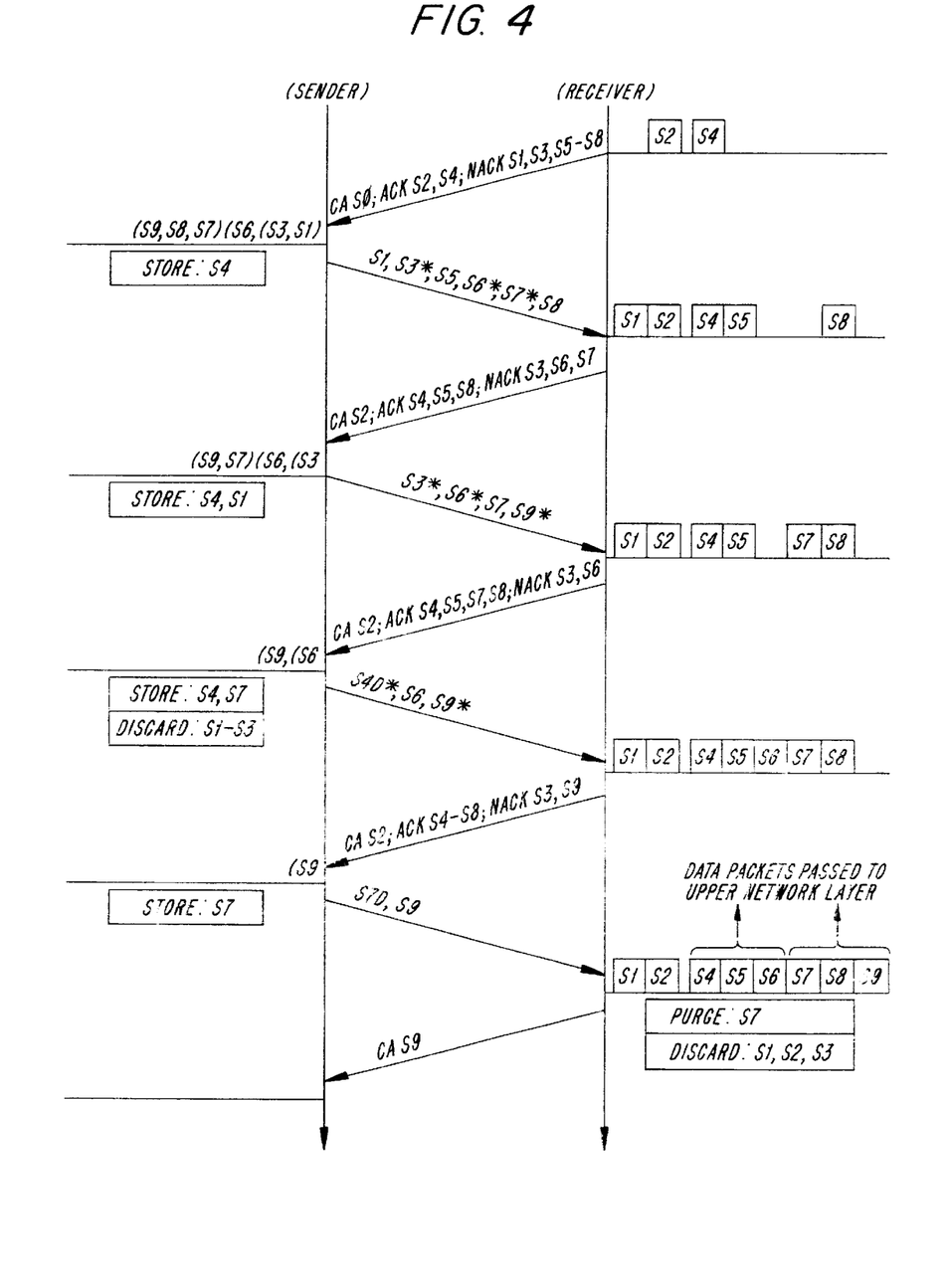
FIG. 4 illustrates a third exemplary embodiment of the present invention, wherein a discard bit in the header of each PDU may be used for discard signaling purposes.

FIG. 4 illustrates the discard mechanism of the third exemplary embodiment, wherein the left-most vertical line represents a timeliness of events occurring at the sender and the right-most vertical line represents a timeliness of events occurring at the receiver. Furthermore, the PDU sequence numbers appearing to the right of the right-most vertical line represent those PDUs that have been successfully received at the input buffer of the receiver, while those to the left of the left-most vertical line represent those PDUs that are stored in the buffer at the sender. The parentheses indicate the beginning and the end of each data packet. For example, sequence numbers S7, S8 and S9 correspond to the first, second and last PDUs of a data packet respectively. In addition, the arrows originating at the receiver represent ARQ messages that include, for example, selective positive acknowledgment signals, selective negative acknowledgment signals, and/or cumulative acknowledgment signals. The arrows originating at the sender represent PDUs being transmitted or retransmitted, wherein the asterisk (*) following certain PDU sequence numbers indicates that a PDU is not successfully received. Finally, a PDU sequence number followed by the letter "D" indicates that the corresponding PDU is a discard-signaling PDU.

Initially, FIG. 4 shows that the input buffer at the receiver contains the PDU having sequence number S2, herein referred to as S2, and PDU having sequence number S4, herein referred to as S4. Moreover, FIG. 4 shows that the receiver transmits an ARQ message to the sender, indicating that all PDUs up to the PDU having sequence number S0 are cumulatively acknowledged, that S2 and S4 are positively acknowledged, and that S1, S3, and S5–S8 are negatively acknowledged. Thus, the buffer at the sender continues to store S1, S3, and S5–S8. The buffer also now contains S9. In addition, the sender stores S4, because S4 is the first PDU of a corresponding data packet which has not been completely acknowledged. As explained previously, the sender will continue to store S4 until all of the PDUs associated with this data packet are acknowledged.

The sender responds by retransmitting S1, S3 and S5–S8. As indicated, S1, S5 and S8 are successfully received; however, S3, S6 and S7 are not successfully received. Accordingly, the input buffer at the receiver now contains S1, S2, S4, S5 and S8. The receiver, in response, transmits an ARQ message that cumulatively acknowledges all PDUs up to and including S2, positively acknowledges S4, S5 and S8, and negatively acknowledges S3, S6 and S7.

The sender, upon receiving the last ARQ message from the receiver, which includes the cumulative acknowledgment up to S2, continues to store S1, despite the fact that S1 was acknowledged by the receiver, for the same reason that the sender is also storing S4, as explained above. Accordingly, the buffer at the sender now contains S3, S6, S7 and S9, as well as S1 and S4. The sender then attempts to retransmit S3, S6, S7 and S9. As indicated, only S7 is successfully received. Thus, the input buffer at the receiver now contains S1, S2, S4, S5, S7 and S8. Therefore, the next ARQ message transmitted to the sender includes a cumulative acknowledgment for all PDUs up to S2, a positive acknowledgment of S4, S5, S7 and S8, and a negative acknowledgment of S3 and S6.

At this point, the sender discards PDUs S1–S3, as indicated in FIG. 4. The sender may decide to do this after the expiration of a certain period of time or after unsuccessfully attempting to retransmit, for example, S3. In addition, the sender continues to store S7, despite the fact that S7 was successfully received until the data packet corresponding to S7 is completely acknowledged. The buffer associated with the sender also contains S6 and S9. The sender now transmits a discard-signaling PDU using S4 (identified as S4D). The sender uses S4 as the discard-signaling PDU because it is the first PDU in the first non-completely acknowledged data packet. In addition, the sender retransmits both S6 and S9. As shown, only S6 is successfully received. Thus, the input buffer at the receiver now contains S1, S2 and S4–S8. Accordingly, the receiver transmits an ARQ message to the sender which includes a cumulative acknowledgment up to S2, a positive acknowledgment of S4–S8, and a negative acknowledgment of S3 and S9.

The negative acknowledgment of S3, in the ARQ message, serves as a notification to the sender that the discard-signaling PDU S4D was not successfully received by the receiver. However, because S6 was successfully received, resulting in the entire data packet comprising S4–S6 being acknowledged, the sender now releases S6 and S4. The sender now regenerates a discard-signaling PDU to notify the receiver which PDUs have been discarded at the sender, but this time the sender uses S7 (identified as S7D) for that purpose, as shown. In addition, the sender retransmits S9. Upon receiving both the discard-signaling PDU S7D and S9, the receiver performs a purge(7) operation, which results in the discarding of all PDUs having a sequence number less than S7 at the receiver. In addition, since the entire data packet comprising S7–S9 has now been successfully received, the receiver can discard S7–S9 as well. Accordingly the receiver transmits an ARQ message to the sender which includes a cumulative acknowledgment up to S9.

It will be understood that as the sender discards PDUs from its buffer, the transmission window advances forward, thus allowing the sender to transmit new PDUs. Also, as the receiver discards PDUs, the receiving window likewise advances forward, and the technique associated with the third exemplary embodiment continues as described above.

In accordance with a fourth exemplary embodiment of the present invention, a one bit extension to the header portion of each PDU is, once again, employed to facilitate discard signaling, where the one bit extension is a discard bit. In this embodiment, the discard bit is used in a somewhat different manner than in the previously described embodiment. In this case, the sender discards PDUs up to a certain data packet. The sender then sets the discard bit for all of the PDUs in a data packet, wherein the data packet is the first data packet that has not been discarded or fully acknowledged. If such a data packet is not yet available at the sender, the sender sets the discard bit for all of the PDUs in the next packet that is available. The discard bit in these PDUs remains set, even during retransmission, should retransmission be necessary. Furthermore, the sender uses the last-stored PDU as the discard-signal PDU (i.e., the PDU in the transmission window with the highest sequence number), if the PDUs associated with the first undischarged data packet cannot be sent, either because they are out of the sender window, or because they have not yet arrived at the sender. Also, the sender regenerates the discard signal when it gets a negative acknowledgment from the receiver for a PDU which has been discarded and a time period $T^{min}$ has elapsed since the sender last generated a discard signal.

Upon receiving a PDU with the discard bit set, the receiver discards all PDUs that are in non-completely received data packets that precede the data packet containing the PDU with the discard bit set. The receiver accomplishes this by maintaining the following variables when there is at least one PDU in the input buffer of the receiver with its discard bit set: HDISCARD, HSTART and -HSTOP. More particularly, the value of the variable HDISCARD represents the highest sequence number of any PDU in the input buffer which has its discard bit set. The value of the HSTART variable represents the highest sequence number of any PDU with the start bit set and with a sequence number that is not higher than the value of HDISCARD. The value of the HSTOP variable represents the highest sequence number of any PDU with its stop bit set and with a sequence number that is less than the value of HDISCARD. It should be noted that if there is no PDU that meets the criteria for the HSTART or HSTOP variable, then the variables HSTART and HSTOP are set equal to a sequence number at the bottom of the receiving window less one (1). In doing so, the variables essentially have no effect on the algorithms governing the purge operation. When there is at least one PDU in the input buffer of the receiver with its discard bit set, the receiver, upon receiving a PDU which increases any of the aforementioned variables HDISCARD, HSTART, or HSTOP, performs a purge(maximum(HSTART, HSTOP+1)) operation.

In accordance with the fourth exemplary embodiment, the receiver, when it gets a PDU with sequence number S and with both the discard bit and the start bit set, performs a purge(S) operation. However, if the sender never sends such a PDU because it has been acknowledged and released by the sender, subsequent PDUs in the data packet also signal discarding. Then, when the data packet is completely received at the receiver, the presence of at least one PDU with its discard bit set guarantees that a purge operation with the sequence number of the first PDU in the data packet is performed. Before the complete data packet is received, however, the receiver is able to perform a "partial purge", that is, a purge operation using a lower sequence number.

Figure 5:
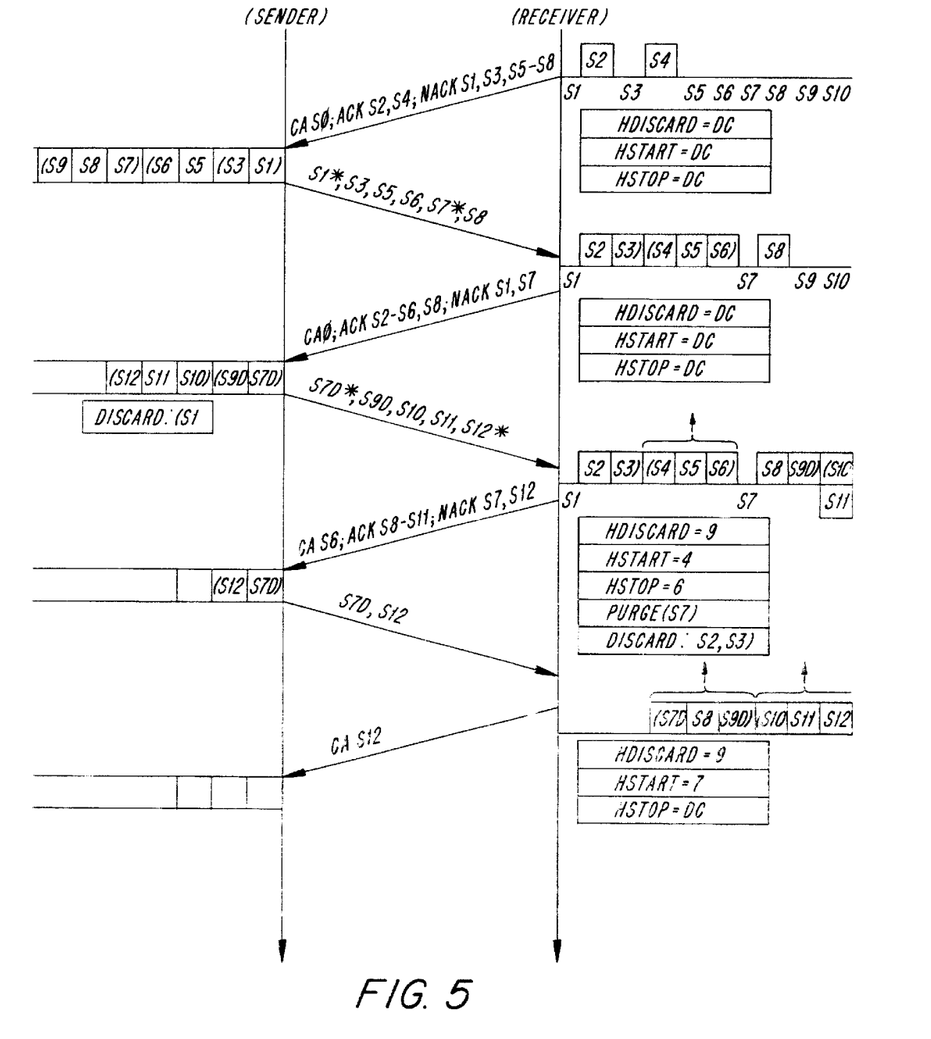
FIG. 5 illustrates a fourth exemplary embodiment of the present invention, wherein a discard bit in the header of each PDU associated with the first data packet which has not been discarded at the sender nor fully acknowledged may be used for discard signaling purposes.

FIG. 5 illustrates the fourth exemplary embodiment, where the left-most vertical line represents a timeliness of events occurring at the sender, and the right-most vertical line represents a timeliness of events occurring at the receiver. Moreover, the sequence numbers appearing to the left of the left-most vertical line represent the PDUs currently stored in the buffer at the sender, while the sequence numbers to the right of the right-most vertical line represent PDUs that have been successfully received into the input buffer of the receiver. In addition, the arrows originating at the right-most vertical line represent ARQ messages, and the arrows originating the left-most vertical line represent the transmission or retransmission of PDUs. Finally, the parentheses indicate the first and last PDUs associated with a given data packet. For example, PDU S7 is the first PDU in its corresponding data packet. Accordingly, the start bit in the header portion of S7 should be set. In contrast, PDU S9 is the last PDU in that same data packet, as indicated by the presence of a left parenthesis. Accordingly, the stop bit in the header portion of S9 should be set.

As illustrated in FIG. 5, only PDU S2 and PDU S4 have been successfully received and stored in the input buffer of the receiver. Accordingly, the receiver transmits an ARQ message to the sender, which includes a cumulative acknowledgement up to S0, a selective positive acknowledgement for S2 and S4, and a selective negative acknowledgement for S1, S3, and S5–S8. Upon receiving this ARQ message the sender releases S2 and S4, as indicated by the contents of the buffer at the sender, and retransmits S1, S3 and S5–S8. The presence of the asterisk (*) indicates, however, that S1 and S7 are not successfully received, whereas S3, S5, S6 and S8 are successfully received. Because there are currently no PDUs with their discard bit stored at the receiver, the values associated with the variables HDISCARD, HSTART and HSTOP are interpreted as "don't care" values, and are thus ignored.

The receiver now transmits another ARQ message to the sender. This ARQ message provides a cumulative acknowledgement up to S0, a selective positive acknowledgement for S2–S6 and S8, and a selective negative acknowledgement for S1 and S7. At this point, the sender discards S1. Of course, the decision to discard may be based on a predefined number of retransmission or based on the expiration of a predefined period of time. As S3, S5 and S6 have been successfully received and acknowledged, the sender also releases these PDUs from its buffer as well, leaving the data packet comprising S7–S9 as the next undischarged and non-completely acknowledged data packet. Accordingly, the discard bit in the header portion of both S7 and S9 are set prior to retransmission. The sender then retransmits S7D and S9D, where the letter "D" signifies that the discard bit has been set. In addition, the data packet comprising S10–S12 has become available at the sender, so the sender transmits these PDUs to the receiver as well. As indicated, however, S7D and S12 are not successfully received. Thus, the only PDU received with its discard bit set is S9D.

Upon receiving S9D, the receiver sets the value of the variable HDISCARD equal to 9, the value of the variable HSTART equal to 4 and the value of the variable HSTOP equal to 6. This, in turn, triggers the receiver to perform a purge(7) operation. Because the data packet comprising S4, S5 and S6 has been fully and successfully received, it is passed on to an upper network layer as illustrated, thereby leaving S2 and S3 to be discarded as a result of the purge(7) operation. The receiver then transmits an ARQ message to the sender, which includes a cumulative acknowledgement up to S6, a selective positive acknowledgement for S8–S11 and a selective negative acknowledgement for S7 and S12.

Upon receiving the latest ARQ message from the receiver, the sender releases S9D, S10 and S11, leaving only S7D and S12. Accordingly, the sender retransmits both S7D and S12. As both of these PDUs are successfully received, the receiver can pass on the corresponding data packets containing S7D–S9D and S10–S12, respectively, to the upper network layers. Consequently, the receiver transmits a next ARQ message, which includes a cumulative acknowledgement up to S12. Upon receiving the ARQ message, the sender is able to clear its buffer as shown.

An alternative to the discard mechanisms of the third and fourth embodiments described above is provided by employing one additional bit extension in the header portion of each PDU. This additional bit is the data valid bit defined previously. Thus, the header portion of each PDU includes both a discard bit and a data valid bit.

This alternative embodiment works as follows. When the buffer at the sender contains no unacknowledged PDUs after the sender performs a discard operation, the first undischarged PDU is regarded as a "dummy" PDU. The data valid bit in the header portion of a dummy PDU is reset, and the discard bit is set. Further, the sequence number of the dummy PDU is one higher than the last discarded PDU. The dummy PDU is then sent, provided that it's sequence number is within the transmission window.

When data valid bits are used, it is not necessary to maintain at least one PDU (i.e., a last-stored PDU) in the send buffer, after a discard operation. In this alternative embodiment, the last-stored PDU is replaced by a last-in window PDU, which is defined as the PDU with the highest sequence number in the transmission window. The last-in window PDU, when sent, has its data valid bit reset.

Upon receiving a PDU whose sequence number is S, and whose data valid bit is reset and whose discard bit is set, the receiver performs a purge(S) operation. The receiver does not acknowledge this PDU either selectively or cumulatively.

What distinguishes this alternative embodiment over the previous embodiments is that the data valid bit provides a way to accomplish discard signaling without actually sending any user data. The advantage to this alternative embodiment is that even after discarding the last PDU in the send buffer, the receiver can be notified as to the discarding of this last PDU at the sender. Thus, the buffer at the receiver can be deallocated immediately, thereby making room for other PDUs.

In accordance with another alternative discard mechanism, which is similar to the discard mechanism described above as the third exemplary embodiment, the sender need not keep the first PDU of a non-completely acknowledged data packet. If the first PDU itself has been acknowledged, the sender may or may not continue to store it in the buffer. The primary difference between this alternative discard mechanism and that of the third exemplary embodiment is that when the sender discards PDUs and the first undischarged PDU can be sent (i.e., because it is in the transmission window), then the discard signal PDU is the first undischarged PDU. If the payload portion of that PDU is available at the sender because it has not been acknowledged or because it has been acknowledged but the PDU continues to store it in the buffer, then the sender transmits the PDU with its payload and the data valid bit set, otherwise the data valid bit is reset. The advantage of this alternative discard mechanism is that it requires a small amount of memory at the sender and at the receiver, since discard signaling can be transmitted immediately and since the sender does not need to maintain PDUs which are already acknowledged.

Figure 6:
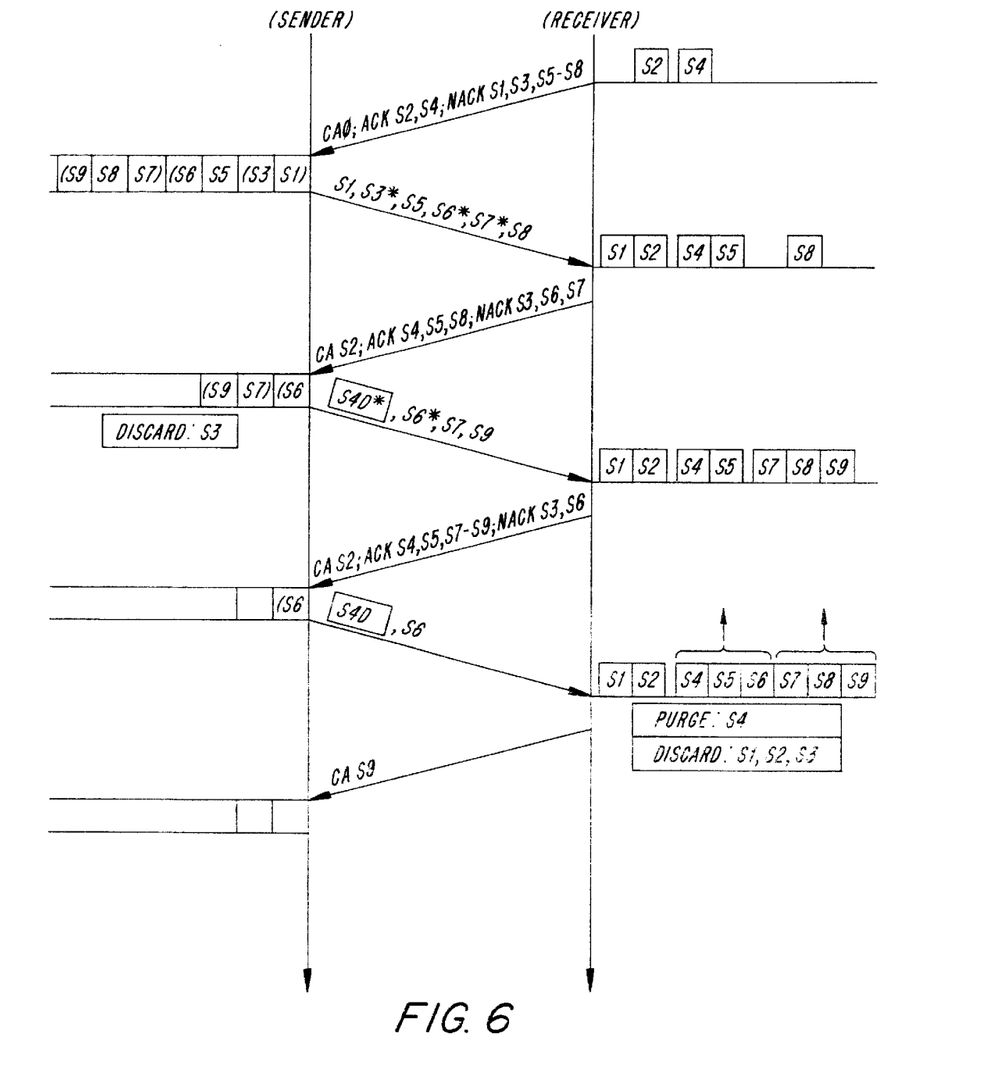
FIG. 6 illustrates another alternative embodiment of the present invention, wherein the sender is not required to maintain, in its buffer, a first PDU of a non-completely acknowledged data packet.

FIG. 6 illustrates this alternative discard mechanism, wherein the left-most vertical line represents a timeliness of events occurring at the sender and the right-most vertical line represent a timeliness of events occurring at the receiver. Moreover, the sequence numbers appearing at the right of the right-most vertical line represent those PDUs which have been successfully received into the input buffer of the receiver, while the sequence numbers to the left of the left-most vertical line represent the PDUs being maintained in the buffer at the sender. In addition, the arrows originating in the receiver represent ARQ messages while the arrows originating at the sender represent the transmission and retransmission of PDUs. Finally, the parentheses indicate the beginning and end of each data packet.

As illustrated in FIG. 6, the input buffer at the receiver initially contains PDU S2, herein referred to as S2, and PDU S4, herein referred to as S4. The receiver then transmits an ARQ message to the sender wherein the ARQ message includes a cumulative acknowledgment up to S0, a selective positive acknowledgment for S2 and S4, and a selective negative acknowledgment for S1, S3, and S5–S8. Upon receiving the selective positive acknowledgment for S2 and S4, the sender releases S2 and S4 from its buffer as shown. The sender then retransmits S1, S3 and S5–S8. The presence of the asterisk (*) next to S3, S6 and S7 is an indication that these PDUs are not successfully received as a result of this retransmission. However, S1, S5 and S8 are successfully received.

Following the last retransmission, the input buffer at the receiver contains S1, S2, S4, S5 and S8 as shown. The receiver then transmits another ARQ message to the sender, wherein the ARQ message includes a cumulative acknowledgement up to S2, a selective positive acknowledgement for S4, S5 and S8, and a selective negative acknowledgement for S3, S6 and S7. Upon receiving this ARQ message, the sender releases S1 and S5, and discards S3. The determination to discard S3 is based upon, for example, a predefined number of retransmissions or the expiration of a predefined period of time. Accordingly, the buffer at the sender now contains S6, S7 and S9 as shown. The sender now generates a discard-signaling PDU using S4 (identified as S4D), as it is the first undischarged PDU. It should be noted that in FIG. 6 the discard-signaling PDU S4D is contained within a box. That box is intended to indicate that the data valid bit in the header portion of this PDU is reset, thereby indicating that the data contained in the payload portion of this PDU is to be ignored. In addition, the sender retransmits S6 and S7, and transmits for the first time S9. As indicated, S7 and S9 are successfully received, while neither the discard-signaling PDU S4D nor S6 are successfully received.

The input buffer at the receiver now contains S1, S2, S4, S5 and S7–S9. The receiver, in response, transmits an ARQ message to the sender which cumulatively acknowledges all PDUs up to S2, negatively acknowledges S3 and S6, and positively acknowledges S4, S5 and S7–S9. As the sender has now been notified that S7 and S9 have been successfully received, S7 and S9 can be released. However, due to the fact that ARQ message cumulatively acknowledged up to S2 only, the sender is cognizant of the fact that the discard-signaling PDU S4D did not arrive at the receiver. Thus, the sender retransmits S4D, as well as S6, which was also not successfully received. Again, it should be noted that the discard-signaling PDU S4D is illustrated in FIG. 6 has being contained in a box, where the box indicates that the data valid bit in the header portion of this PDU is reset, thereby indicating that the data contained in the payload portion of this PDU is to be ignored. This time, both S4D and S6 are successfully received, and as a result, the receiver performs a purge(4) operation, wherein S1–S3 are discarded. Moreover, as the receiver has now successfully received S4–S6 and S7–S9, the two data packets associated with these PDUs can be delivered to an upper network layer and an ARQ message can be transmitted back to the sender which includes a cumulative acknowledgment up to S9.

The present invention has been described with reference to a number of exemplary embodiments. However, it will be readily apparent to those skilled in the art that it is possible to embody the invention in specific forms other than those described above without departing from the spirit of the invention. The various embodiments are illustrative, and they. should not be considered restrictive in any way. The scope of the invention is given by the appended claims, rather than the preceding description, and all variations and equivalents thereof which fall within the range of the claims are intended to be embraced therein.

What is claimed is:

1. A method for discarding data units for Selective Repeat ARQ, said method comprising the steps of:

transmitting a first data unit from a sender to a receiver;

initiating a first timer in connection with said step of transmitting the first data unit;

transmitting a second data unit from the sender to the receiver;

initiating a second timer in connection with the second data unit being received;

at the sender, discarding the first data unit if a time period corresponding to the first timer expires before the sender receives an acknowledgment from the receiver that the first data unit was received; and performing a purge operation at the receiver as a function of the second data unit, if a time period corresponding to the second timer expires before the first data unit is received.

2. A method for discarding data units for Selective Repeat ARQ, said method comprising the steps of:

transmitting, from a sender to a receiver, a plurality of data units, wherein each of said plurality of data units is associated with a common data packet, and wherein each of said plurality of data units is assigned a sequence number representing the order in which the corresponding data unit is transmitted;

initiating a first timer in connection with the transmission of a first of said plurality of data units;

initiating a second timer if a second of said plurality of data units is received when the receiver is expecting to receive at least one data unit having a sequence number indicating that the at least one data unit was transmitted before the second of said plurality of data units;

at the sender, discarding each of said plurality of data units associated with the common data packet if any one of said plurality of data units has not been acknowledged as being received before a time period associated with the first timer expires; and at the receiver, performing a purge operation as a function of the second of said plurality of data units, if a time period associated with the second timer expires and the receiver is expecting to receive at least one data unit having a sequence number indicating that the at least one data unit was transmitted before the second of said plurality data units.

3. A method for discarding data units for Selective Repeat ARQ, said method comprising the steps of:

transmitting a plurality of data units from a sender to a receiver, wherein a first timer is maintained at the sender and a second timer is maintained at the receiver, wherein each of the plurality of data units is assigned a sequence number representing the order in which the corresponding data unit is transmitted, and wherein a higher sequence number reflects a later transmission and a lower sequence number reflects an earlier transmission;

at the sender, maintaining a variable HSS which has a value that represents the highest sequence number of any data unit that has been transmitted at a given point during a present cycle of the first timer:

at the receiver, maintaining two variables, HSR1 and HSR2, wherein HSR1 has a value that represents the highest sequence number of any data unit received at a given point during a present cycle of the second timer, and wherein HSR2 which has a value that represents the highest sequence number of any data unit received at a same point during a previous cycle of the second timer:

at the given point during each cycle of the first timer, discarding any data unit at the sender that has a sequence number that is less than the value of the variable HSS and, thereafter, updating the value of the variable HSS; and at the given point during each cycle of the second timer, purging any data unit having a sequence number that is less than the value of the variable HSR2 and, thereafter, updating the value of the variables HSR1 and HSR2.

4. A method for discarding data units for selective Repeat ARQ, wherein said method comprises the steps of:

defining a transmission window, wherein the transmission window represents a sequence of K number of data units which are eligible for transmission from a sender to a receiver, wherein each data unit is assigned a sequence number which represents the order of transmission associated with the corresponding data unit;

at the sender, discarding one or more data units that are currently within the transmission window, wherein the one or more data units have sequence numbers that indicate the one or more data units were transmitted prior to all other data units currently in the transmission window;

advancing the transmission window forward as a function of the one or more discarded data units;

defining a receiving window, wherein the receiving window represents a sequence of data units which have been received or are expected to be received; and if a data unit having a sequence number S is received, wherein the sequence number S is above the receiving window, performing a purge operation at the receiver as a function of the sequence number S-K+1.

5. A method for discarding data units for Selective Repeat ARQ, said method comprising the steps of:

transmitting a plurality of data units from a sender to a receiver, wherein said plurality of data units are associated with data packets, and wherein each data packet may be associated with one or more data units;

at the sender, storing a first data unit associated with a data packet until the receiver completely acknowledges the data packet;

discarding one or more data units, at the sender, which have a sequence number indicating that they were transmitted before said first data unit;

generating a discard-signaling data unit by setting a discard-bit in a header portion of said first data unit;

transmitting said discard-signaling data unit to the receiver, so as to notify the receiver that the one or more data units have been discarded at the sender; and performing a purge operation at the receiver as a function of a sequence number associated with said discard-signaling data unit.

6. The method of claim 1, wherein the time period corresponding to the second timer is greater than or equal to the time period corresponding to the first timer.

7. The method of claim 1, wherein said step of performing a purge operation at the receiver as a function of the second data unit, if a time period corresponding to the second timer expires before the first data unit is received, comprises the step of:

releasing buffer space at the receiver allocated for the first data unit.

8. The method of claim 1, wherein said first data unit and said second data unit are protocol data units.

9. The method of claim 2, wherein the at least one data unit having a sequence number indicating that the at least one data unit was transmitted before the second of said plurality of data units is one of said plurality of data units.

10. The method of claim 2, wherein said time period associated with the second timer is greater than or equal to the time period associated with the first timer.

11. The method of claim 2, wherein said step of performing a purge operation as a function of a second of said plurality of data units comprises the step of:

discarding a received data unit if it is associated with a non-completely received data packet, and if it has a sequence number indicating that it was transmitted before any of the plurality of data units associated with the common data packet.

12. The method of claim 2, wherein said step of performing a purge operation as a function of the second of said plurality of data units comprises the step of:

releasing buffer space allocated to any data unit that the receiver is expecting to receive, if the data unit has a sequence number indicating that it was transmitted before any of the plurality of data units associated with the common data unit.

13. The method of claim 2, wherein said step of performing a purge operation as a function of the second of said plurality of data units comprises the step of:

transporting a group of received data units that are associated with a completed received data packet, wherein each of the data units associated with the group have a sequence number indicating that they were transmitted before any of the plurality of data units associated with the common data packet.

14. The method of claim 3, wherein said step of purging any data unit having a sequence number that is less than the value of the variable HSR2 and, thereafter, updating the value of the variables HSR1 and HSR2, comprises a step of:

setting the value of the variable HSR2 equal to the value of the variable HSR1 and, thereafter, setting the value of the variable HSR1 equal to the highest sequence number of any data unit received thus far.

15. The method of claim 14, wherein said step of purging any data unit having a sequence number that is less that the value of the variable HSR2 and, thereafter, updating the value of the variables HSR1 and HSR2, comprises the step of:

discharging any data unit having a sequence number that is less that the value of the variable HSR2.

16. The method of claim 14, wherein said step of purging any data unit having a sequence number that is less than the value of the variable HSR2 and, thereafter, updating the value of the variables HSR1 and HSR2, comprises the step of:

releasing buffer space at the receiver allocated to any missing data unit having a sequence number that is less than the value of the variable HSR2.

17. The method of claim 4, wherein said step of performing a purge operation at the receiver as a function of the sequence number S-K+1, comprises the step of:

discarding a received data unit having a sequence number that is less than S-K+1.

18. The method of claim 4, wherein said step of performing a purge operation at the receiver as a function of sequence number S-K+1, comprises the step of:

releasing a missing data unit that has a sequence number that is less than S-K +1.

19. The method of claim 4, wherein said step of advancing the transmission window forward as a function of the one of more discarded data units, comprises the step of:

advancing the transmission window forward as a function of the number of said one or more discarded data units.

20. The method of claim 5, wherein the data packet associated with the first data unit is further associated with a plurality of data units, and wherein the first data unit has a sequence number indicating that is was transmitted before any of the other of said plurality of said data units.

21. The method of claim 5, wherein said step of performing a purge operation at the receiver as a function of a sequence number associated with said discard-signaling data unit, comprises the step of:

discarding a received data unit that has a sequencing number indicating that the received data unit was transmitted before the first data unit.

22. The method of claim 5, wherein said step of performing a purge operation at the receiver as a function of a sequence number associated with said discard-signaling unit, comprises the step of:

releasing buffer space allocated to a data unit that the receiver is expecting to receive, wherein the data unit that the receiver is expecting to receive has a sequence number indicating that is was transmitted before the first data unit.

23. A method of discarding data units for Selective Repeat ARQ, said method comprising the steps of:

transmitting a plurality of data units from a sender to a receiver, wherein said plurality of data units are associated with data packets such that each data packet may comprise one or more data units, and wherein each of said plurality of data units are assigned a sequence number indicating the order of transmission for the corresponding data unit;

discarding a data unit at the sender;

generating one or more discard-signaling data units by setting a discard bit in a header portion of each data unit at the sender associated with a next available data packet at the sender, wherein the next available data packet at the sender comprises one or more data units that have not been discarded or acknowledged by the receiver as being received, and wherein each of the one or more data units have a sequence number indicating that the one or more data units associated with the next available data packet were transmitted after the discarded data unit;

transmitting the one or more discard-signaling data units; and upon receiving any of the one or more discard-signaling data units, discarding a received data unit associated with a non-completely received data packet, if the received data unit has a sequence number indicating that it was transmitted before any of the one or more discard-signaling data units.

24. The method of claim 6 further comprising the steps of:

maintaining a first variable equal to a first sequence number of a first received discard-signaling data unit, wherein the first sequence number indicates that the first discard-signaling data unit was transmitted before any other discard-signaling data unit;

maintaining a second variable equal to a second sequence number associated with a second discard-signaling data unit which has a start bit in its header portion set, wherein the second sequence number indicates that the second discard-signaling data unit was transmitted after the first discard-signaling data unit;

maintaining a third variable equal to a third sequence number associated with a third discard-signaling data unit which has a stop bit in its header portion set, wherein the third sequence number indicates that the third discard-signaling data unit was transmitted after the first discard-signaling data unit, wherein said step of discarding a received data unit associated with a non-completely received data packet is accomplished as a function of the first, second and third variables.

25. The method of claim 6 further comprising the step of:

upon receiving any of the one or more discard-signaling data units, releasing buffer space at the receiver allocated for a data unit that has not been received, if the data unit that has not yet been received has a sequence number indicating that it was transmitted before any of the one or more discard-signaling data units.

26. The method of claim 6 further comprising the step of:

upon receiving any of the one or more discard-signaling data units, transporting a group of one or more data units associated with a completely received data packet to a higher network layer.

27. A method of discarding data units for Selective Repeat ARQ, said method comprising the steps of:

transmitting a plurality of data units from a sender to a receiver, wherein each of said plurality of data units are assigned a sequence number indicating the order of transmission for each of said plurality of data units;

discarding a data unit at the sender;

generating a discard-signaling data unit as a function of a first undischarged data unit following the discarded data unit, wherein a discard-signaling data unit has a discard bit in a header portion of the data unit set and a data valid bit in the header portion of the data unit reset;

transmitting the discard-signaling data unit to the receiver; and performing a purge operation at the receiver as a function of the sequence number associated with the discard-signaling data unit.

28. The method of claim 7, wherein said step of performing a purge operation at the receiver as a function of the sequence number associated with the discard-signaling data unit, comprises the step of:

discarding a received data unit that has a sequence number indicating that the received data unit was transmitted before the discard-signaling data unit.

29. The method of claim 7, wherein said step of performing a purge operation at the receiver as a function of the sequence number associated with the discard-signaling data unit, comprises the step of:

releasing buffer space at the receiver allocated for a data unit that has not yet been received, if the data unit that has not yet been received has a sequence number indicating that it was transmitted before the discard-signaling data unit.

30. A method for discarding data units for Selective Repeat ARQ, said method comprising steps of:

transmitting a plurality of data units from a sender to a receiver, wherein said plurality of data units are associated with data packets, and wherein each data packet may be associated with one or more data units, and wherein each of said plurality of data units are assigned a sequence number indicating the order of transmission for the corresponding data unit;

at the sender, storing a first data unit associated with a data packet at least until the receiver completely acknowledges the data packet;

discarding one or more data units, at the sender, which have a sequence number indicating that they were transmitted or sequence number which indicate that they would have been transmitted before said first data unit;

generating a discard-indication message including the corresponding sequence number of first said data unit;

transmitting said discard-indicating message to the receiver, so as to notify the receiver that one or more data units have been discarded at the sender; and performing a purge operation at the receiver as a function of the sequence number conveyed in the discard-indicating message.

31. The method of claim 30, wherein the data packet associated with the first data unit is further associated with a plurality of data units, and wherein the first data unit has a sequence number indicating that is was transmitted before any of the other of said plurality of said data units.

32. The meted of claim 30, wherein said step of performing a purge operation at the receiver as a function of a sequence number conveyed in said discard-indicating message, comprises abe step of:

discarding a received data unit that has a sequencing number indicating that the received data unit was transmitted before the first data unit.

33. The method of claim 30, wherein said step of performing a purge operation at the receiver as a function at a sequence number conveyed in said discard-indicating message, comprises the step of:

releasing buffer space allocated to a data unit that the receiver is expecting to receive, wherein the data unit that the receiver is expecting to receive has a sequence number indicating that is was transmitted before the first data unit.

34. A method for discarding data units for Selective Repeat ARQ, said method comprising steps of:

transmitting a plurality of data units from a sender to a receiver, wherein said plurality of data units are associated with data packets, and wherein each data packet may be associated with one or more data units, and wherein each of said plurality of data units are assigned a sequence number indicating the order of transmission for the corresponding data unit;

discarding one or more data units at the sender;

generating one or more discard-indication messages including the corresponding sequence number associated with a next available data packet at the sender, wherein the next available data packet at the sender comprise one or more data units that have not been discarded or acknowledged by the receiver as being received;

transmitting the one or more discard-indication messages;

and upon receiving any of the one or more discard-indication messages, discarding a received data unit associated with a non-completely received data packet, if the received data unit has a sequence number indicating that it was transmitted before the sequence number conveyed in any of the one or more discard-indication messages.

* * * * *